United States Patent
Yang (10) Patent No.: US 8,037,745 B2
(45) Date of Patent: Oct. 18, 2011

(54) SENSOR FOR TIRE PRESSURE AND TIRE PRESSURE MONITORING SYSTEM HAVING THE SAME

(75) Inventor: Cheol Ho Yang, Gyeonggi-do (KR)

(73) Assignee: Nae Woi Korea, Ltd., Seoul (KR)

( * ) Notice: Subject to any disclaimer, the term of this patent is extended or adjusted under 35 U.S.C. 154(b) by 234 days.

(21) Appl. No.: 12/516,568

(22) PCT Filed: Oct. 9, 2008

(86) PCT No.: PCT/KR2008/005914
§ 371 (c)(1),
(2), (4) Date: May 27, 2009

(87) PCT Pub. No.: WO2009/054625
PCT Pub. Date: Apr. 30, 2009

(65) Prior Publication Data
US 2010/0043542 A1   Feb. 25, 2010

(30) Foreign Application Priority Data
Oct. 26, 2007   (KR) .................... 20-2007-0017397 U (51) Int. Cl.
*B60C 23/02* (2006.01)
(52) U.S. Cl. ......................................... 73/146.8; 73/146
(58) Field of Classification Search ........................ None
See application file for complete search history.

(56) References Cited

U.S. PATENT DOCUMENTS

| | | | |
|---|---|---|---|
| 3,717,845 A * | 2/1973 | Winther | 340/442 |
| 4,337,652 A * | 7/1982 | Matsuda et al. | 73/146.5 |
| 4,352,090 A * | 9/1982 | Ohama | 340/435 |
| 4,953,395 A * | 9/1990 | Jard | 73/146.8 |
| 4,998,438 A | 3/1991 | Martin | |
| 5,429,166 A | 7/1995 | Anzai et al. | |
| 6,011,463 A * | 1/2000 | Cormier, Sr. | 340/447 |
| 7,251,994 B2 * | 8/2007 | Maldonado et al. | 73/146.8 |

FOREIGN PATENT DOCUMENTS

| | | |
|---|---|---|
| JP | 06166309 A | 6/1994 |
| KR | 10-2003-006086 | 7/2003 |

OTHER PUBLICATIONS

PCTKR0805914 S.R., Apr. 30, 2009, WIPO Search Report for priority app PCT/KR08/05914.
PCTKR0805914 W.O., Apr. 30, 2009, WIPO Written Opinion—priority app PCT/KR08/05914.

* cited by examiner

*Primary Examiner* — Lisa Caputo
*Assistant Examiner* — Jermaine Jenkins
(74) *Attorney, Agent, or Firm* — Charles A. Lemaire; Lemaire Patent Law Firm, P.L.L.C.

(57) ABSTRACT

Provided is a tire pressure monitoring system including: a tire pressure measurement sensor including a pressure detection means for detecting an air pressure in a tire, a connection pipe for connecting an air injection valve of the tire to the pressure detection means, a fixing means for fixing the connection pipe to the air injection valve of the tire, and an air injection means connected to the pressure detection means to inject air into the tire through the pressure detection means; and a display for showing the air pressure of each tire of a vehicle to a driver, wherein the tire pressure measurement sensor is mounted in the air injection valve of the tire and transmits a pressure value of the tire to the display through wireless communication.

8 Claims, 7 Drawing Sheets

[Fig. 1]

*Prior Art*

SENSOR FOR TIRE PRESSURE AND TIRE PRESSURE MONITORING SYSTEM HAVING THE SAME

CROSS-REFERENCE TO RELATED APPLICATIONS

This U.S. national-stage application under 35 U.S.C. 371 claims the benefit under 35 U.S.C. §119(a)-(d), 35 U.S.C. §365(a)-(c), and 37 CFR §1.55 of International Application Number PCT/KR2008/005914, with an international filing date of Oct. 9, 2008 (International Publication Number WO 2009/054625, with a publication date of Apr. 30, 2009), and of Korean Patent Application Number 20-2007-0017397 filed on Oct. 26, 2007 (to which Application PCT/KR2008/005914 claimed priority), each of which is incorporated herein by reference in its entirety.

TECHNICAL FIELD

The present invention relates to a tire pressure measurement sensor for an automobile and a tire pressure monitoring system having the same, and more particularly, to a pressure sensor directly mounted in an air injection valve for a tire.

BACKGROUND ART

The element that most directly affects the safety and life of a driver while driving a vehicle is the tire. In order to achieve safety while driving, the tire must maintain an appropriate air pressure. Damage to the tire during driving may cause a serious accident. Therefore, if the driver can previously detect damage to the tire, the accident may be prevented. A technique that is currently being used for this purpose is a tire pressure monitoring system (TPMS). The TPMS detects the temperature and pressure in the tire in real time and informs a driver of a state of the tire to prevent blowout of the tire, thereby minimizing collision accidents due to tires.

Figure 1:
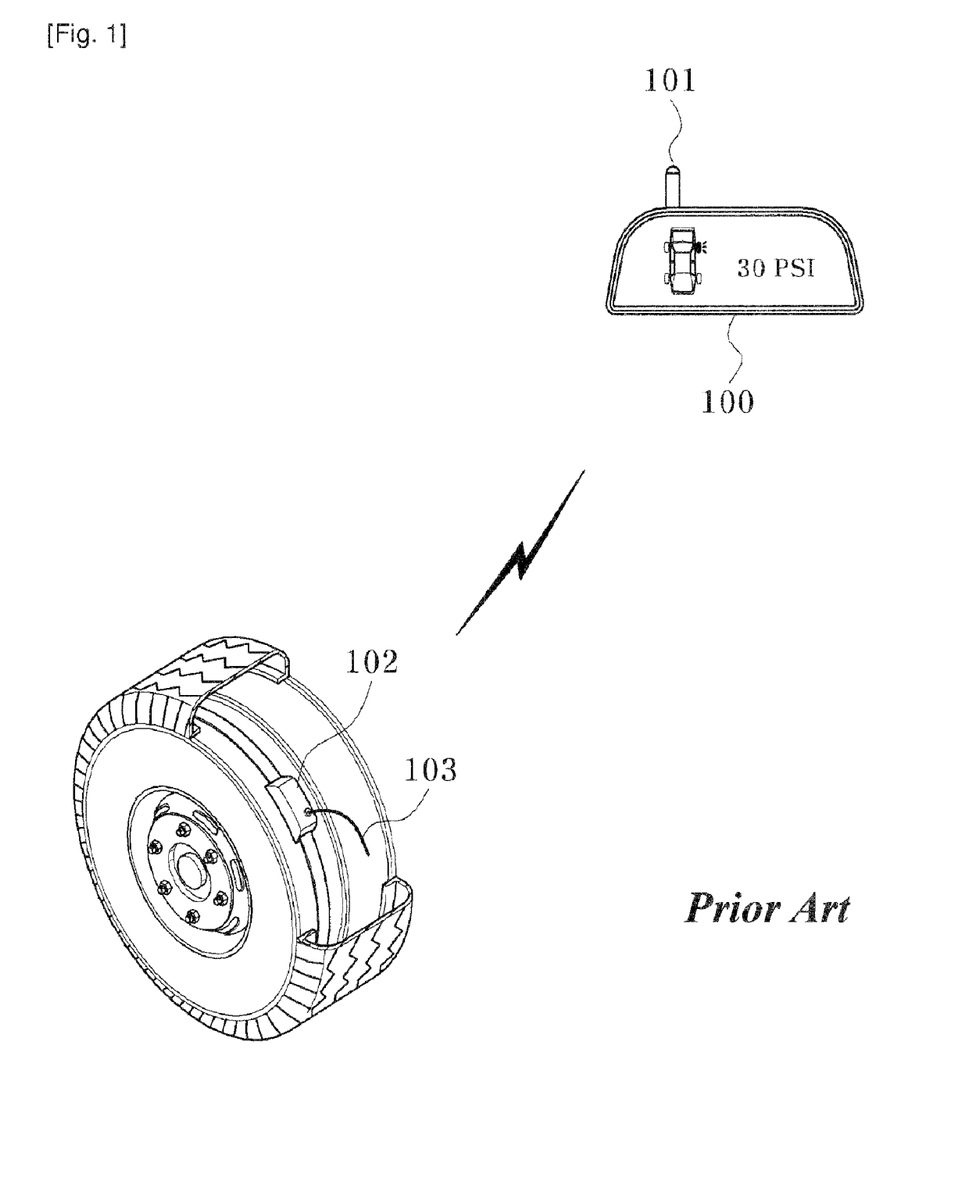
FIG. 1 is a perspective view of a conventional tire pressure monitoring system.

FIG. 1 is a perspective view of a conventional TPMS. Referring to FIG. 1, the TPMS includes a display 100, and pressure sensors 102.

The pressure sensors 102 are mounted on each of four wheels, on which tires are fitted. As shown in FIG. 1, the pressure sensors 102 are mounted on the wheels using a metal strip, etc. After the pressure sensors 102 are mounted on the wheels, the tires are fitted on the wheel. Antennae 103 are attached to the pressure sensors 102 to send and receive pressure data to and from the display 100 in a wireless manner. The pressure sensors 102 have batteries, and vary a period for data transmission/reception depending on user settings and variations in tire pressure.

The display 100 is located at a position visible to a driver, generally, a dashboard on an instrument panel. The display 100 includes an antenna 101 for receiving pressure data from the four pressure sensors 102, and a controller for presenting the pressure data to the driver to determine whether each tire pressure is in a hazardous range.

As shown in FIG. 1, the display 100 displays the four wheels and current pressures thereof. In this case, when the tire pressure departs from a preset pressure range, the display may provide an alarm to the driver.

However, since the conventional TPMS must have the four pressure sensors 102 mounted on the wheels, the tire must be separated from the wheel to be mounted on the wheel. In addition, since the pressure sensor must be mounted on the wheel using a metal strip, etc., it is difficult for an ordinary person to directly mount the pressure sensor on the wheel.

Further, the pressure sensor may be loosened and then separated from the wheel as the vehicle is driven.

Furthermore, since the conventional TPMS has the pressure sensors 102 disposed in the tires, it is difficult to transmit and receive data between the pressure sensor and the display in a wireless manner. That is, since radio waves must be transmitted to the display through the tires, reception may be decreased, thereby causing frequent errors. In particular, since tires of a truck or bus are very thick, the radio waves are prone to be blocked by the tire, thereby causing errors.

Disclosure of Invention: Technical Problem: The present invention is directed to a tire pressure monitoring system capable of being readily mounted by an ordinary person and reducing wireless transmission/reception errors of data.

Technical Solution: According to an aspect of the present invention, a tire pressure measurement sensor includes: a pressure detection means for detecting an air pressure in a tire; a connection pipe for connecting an air injection valve of the tire to the pressure detection means; a fixing means for fixing the connection pipe to the air injection valve of the tire; and an air injection means connected to the pressure detection means to inject air into the tire through the pressure detection means.

Here, the tire pressure measurement sensor may further include an extension means interposed between the connection pipe and the pressure detection means; and an attachment means for attaching a distal end of the extension means adjacent to the pressure detection means to the wheel of the tire.

In addition, the tire pressure measurement sensor may further include a rubber ring inserted between the air injection valve of the tire and the connection pipe to prevent air leakage.

In particular, the fixing means may have a cylindrical shape with a thread formed therein, and may be threadedly engaged with the air injection valve of the tire.

According to another aspect of the present invention, a tire pressure monitoring system includes: a tire pressure measurement sensor including a pressure detection means for detecting an air pressure in a tire, a connection pipe for connecting an air injection valve of the tire to the pressure detection means, a fixing means for fixing the connection pipe to the air injection valve of the tire, and an air injection means connected to the pressure detection means to inject air into the tire through the pressure detection means; and a display for showing the air pressure of each tire of a vehicle to a driver, wherein the tire pressure measurement sensor is mounted in the air injection valve of the tire and transmits a pressure value of the tire to the display through wireless communication.

Advantageous Effects

According to the present invention, since a pressure sensor can be directly mounted in an air injection valve of a tire of a vehicle, it is possible to more readily mount the pressure sensor than in the conventional art.

In addition, since the pressure sensor is mounted on the exterior of the tire, the pressure sensor can directly perform wireless communication with a display located adjacent to a driver, thus remarkably reducing an error ratio. Further, since an air injection means and a connection pipe of the pressure sensor act as an antenna, there is no need to provide a separate antenna.

BRIEF DESCRIPTION OF THE DRAWINGS

The above and other objects, features and advantages of the present invention will be more clearly understood from the following detailed description when taken in conjunction with the accompanying drawings, in which.

Mode for the Invention: The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 2:
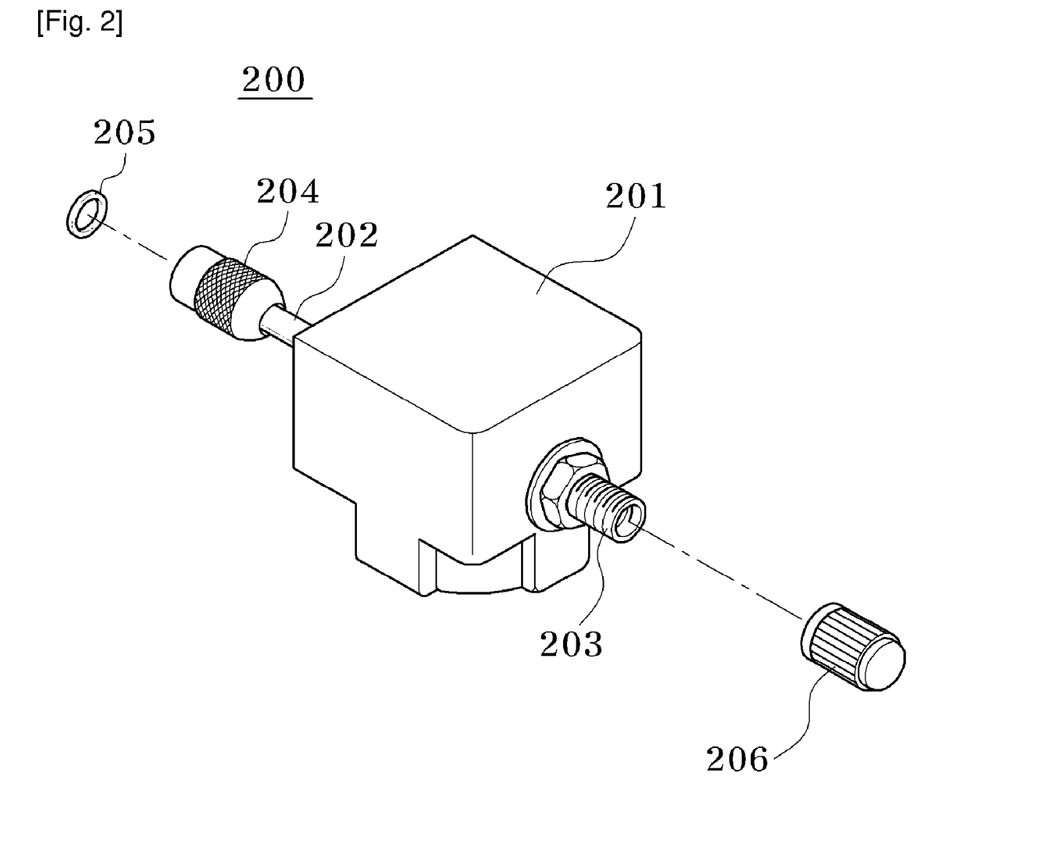
FIG. 2 is an exploded perspective view of a tire pressure measurement sensor in accordance with an exemplary embodiment of the present invention.
Figure 3:
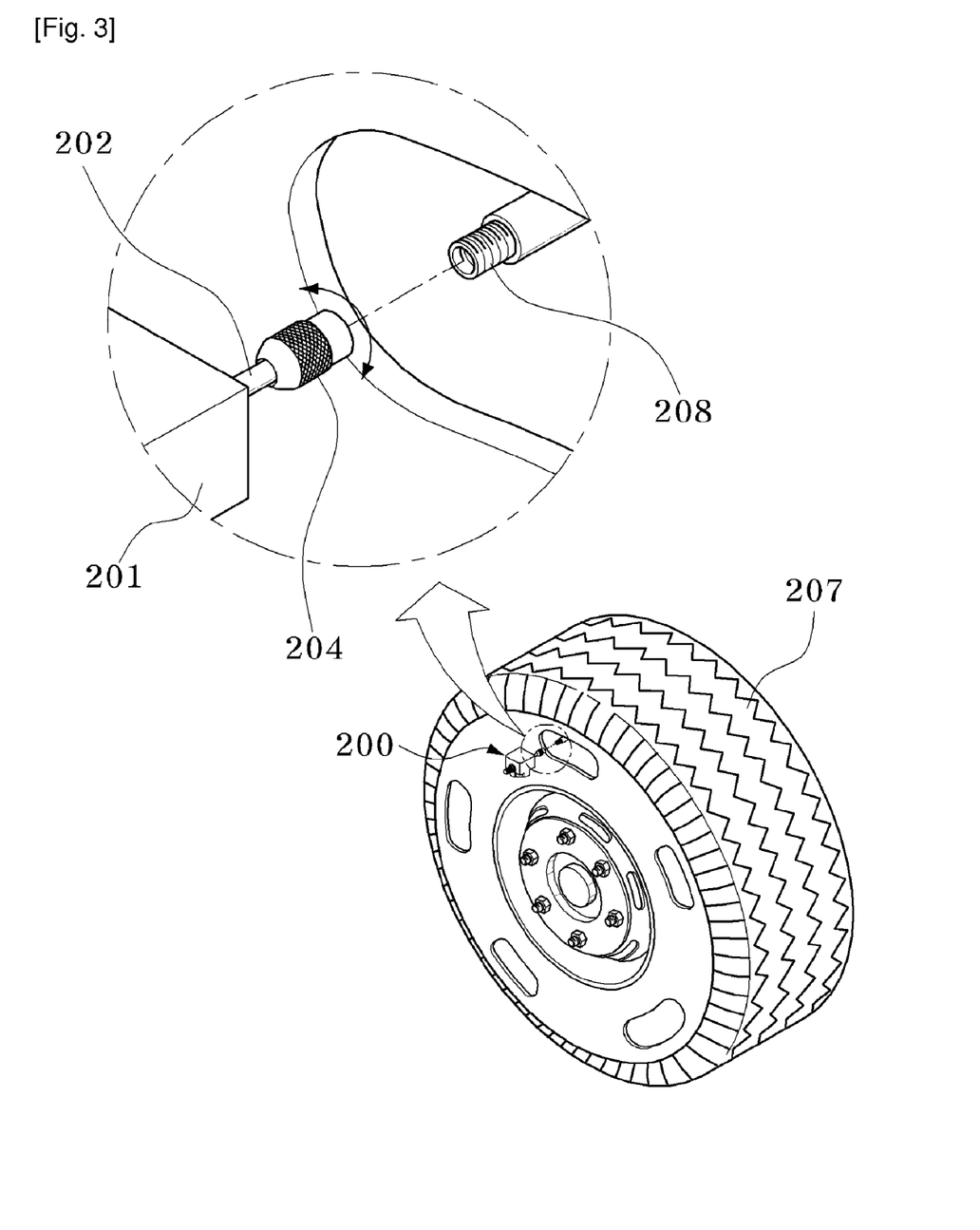
FIG. 3 is a view for explaining attachment of the tire pressure measurement sensor of FIG. 2 to a tire.

FIG. 2 is an exploded perspective view of a tire pressure measurement sensor 200 in accordance with an exemplary embodiment of the present invention, and FIG. 3 is a view for explaining attachment of the tire pressure measurement sensor 200 of FIG. 2 to a tire.

Referring to FIG. 2, the tire pressure measurement sensor 200 in accordance with an exemplary embodiment of the present invention includes a pressure detection means 201, a connection pipe 202, a fixing means 204, and an air injection means 203.

First, the pressure detection means 201 functions to detect an air pressure in a tire 207, and may have a transmission part (not shown) for transmitting the detected pressure value to a display.

The connection pipe 202 connects an air injection valve 208 of the tire 207 to the pressure detection means 201 so that an air pressure in the tire is directly transmitted to the pressure detection means through the connection pipe 202. The connection pipe 202 may have a pipe shape with an outer diameter equal to an inner diameter of the air injection valve such that the connection pipe 202 can be inserted into the air injection valve 208 of the tire 207.

The fixing means 204 functions to fix the connection pipe 202 to the air injection valve 208 of the tire. The fixing means 204, as shown in FIG. 2, has a cylindrical shape with a thread formed therein to be threadedly engaged with the air injection valve 208 of the tire. In addition, a rubber ring 205 may be inserted between the air injection valve 208 of the tire and the connection pipe to prevent air leakage. In this case, the fixing means 204 is threadedly engaged with the air injection valve 208 of the tire to be sealed by the rubber ring 205.

After the pressure sensor 200 is coupled to the air injection valve 208 of the tire, air can be injected into the tire 207 through the air injection means 203 installed at the pressure sensor 200. The air injection means 203 may have the same shape as the air injection valve 208 of the tire, may be installed in the pressure detection means 201, and may have a cap 206.

The pressure sensor 200 shown in FIG. 2 is attached to the tire 207, as shown in FIG. 3. Each wheel of a vehicle is constituted by a steel wheel and a rubber tire fitted onto the wheel. The pressure sensor 200 is directly threadedly engaged with the air injection valve 208 of the tire.

Specifically, the wheel of a vehicle, in particular, a wheel of a truck or bus has the air injection valve 208 projecting to the exterior of the tire. After inserting the connection pipe 202 into the air injection valve 208, the fixing means 204 is turned to fix the pressure sensor 200. Since a method of attaching the pressure sensor 200 to the tire 207 in accordance with an exemplary embodiment of the present invention is very simple compared to the conventional art, it is possible for even a general consumer to readily attach the pressure sensor.

Figure 4:
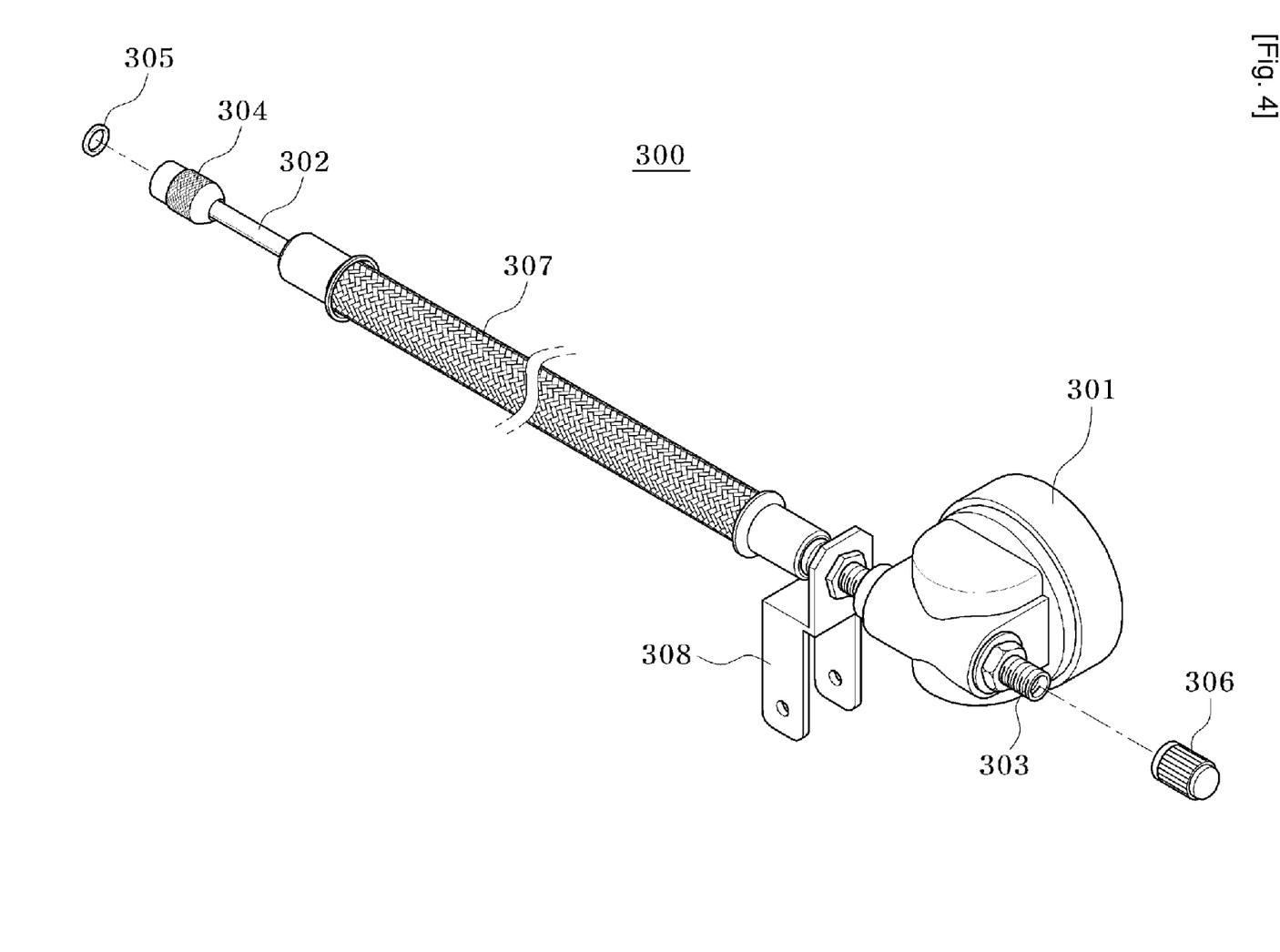
FIG. 4 is an exploded perspective view of a tire pressure measurement sensor in accordance with another exemplary embodiment of the present invention.
Figure 5:
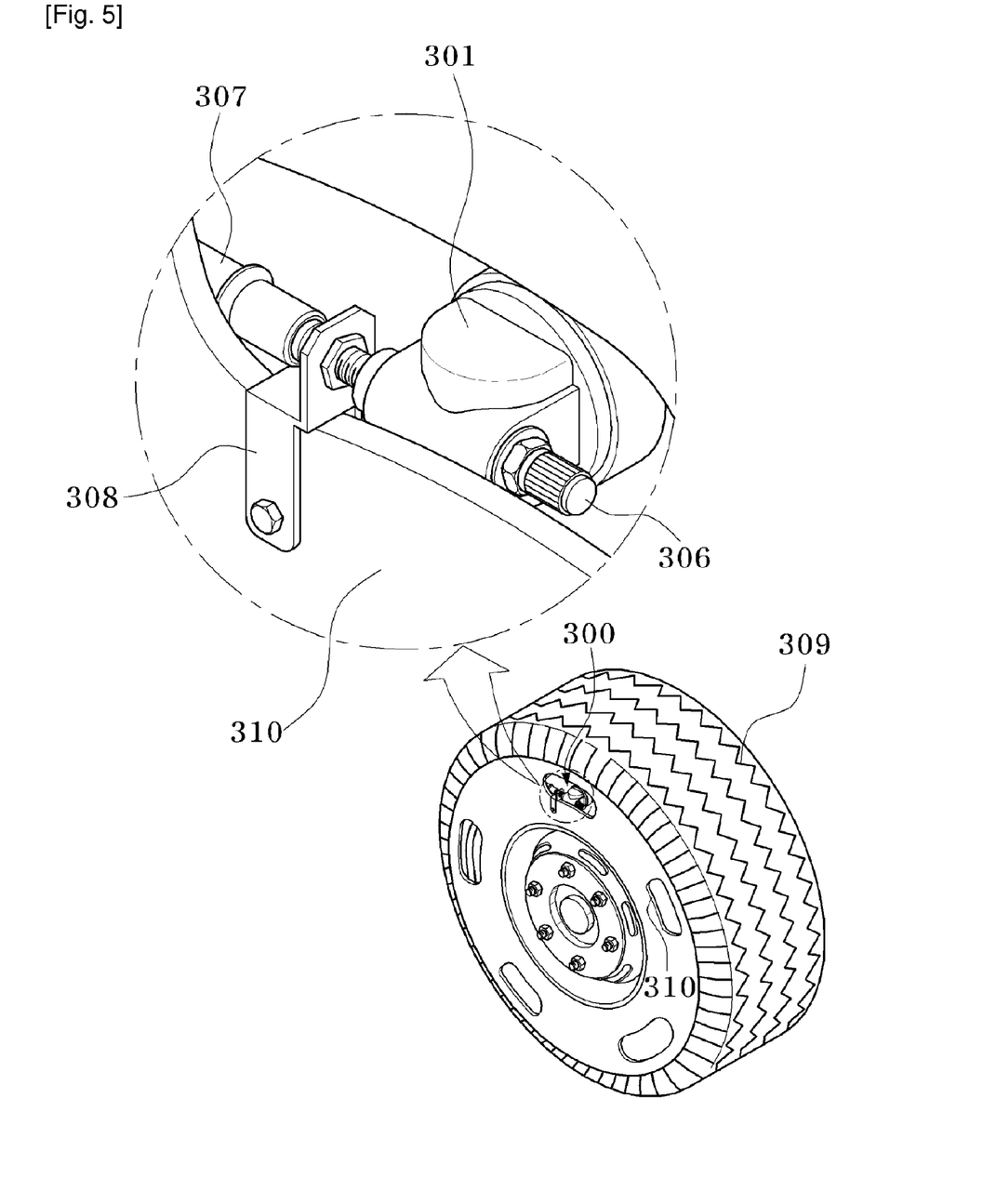
FIG. 5 is a view for explaining attachment of the tire pressure measurement sensor of FIG. 4 to a tire.

FIG. 4 is an exploded perspective view of a tire pressure measurement sensor 300 in accordance with another exemplary embodiment of the present invention, and FIG. 5 is a view for explaining attachment of the tire pressure measurement sensor 300 of FIG. 4 to a tire 309.

As shown in FIG. 4, the tire pressure measurement sensor 300 in accordance with another exemplary embodiment of the present invention further includes an extension means 307 and an attachment means 308.

The extension means 307 has a flexible hose shape, and is inserted between a connection pipe 302 and a pressure detection means 301. The attachment means 308 is further attached to a distal end of the extension means 307 adjacent to the pressure detection means 301. The attachment means 308 has substantially a C shape to more readily attach the pressure sensor 300 to a wheel 310 of the tire 309.

As shown in FIG. 5, after the connection pipe 302 is threadedly engaged with an air injection valve of the tire by a fixing means, the pressure sensor 300 is attached to the tire wheel 310 using the extension means 307 and the attachment means 308. As a result, even when vibrations occur as the vehicle is driven, the pressure sensor cannot be readily separated from the tire wheel. In order to securely fix the attachment means 308 to the wheel 310, a nut and a bolt can be used.

Figure 6:
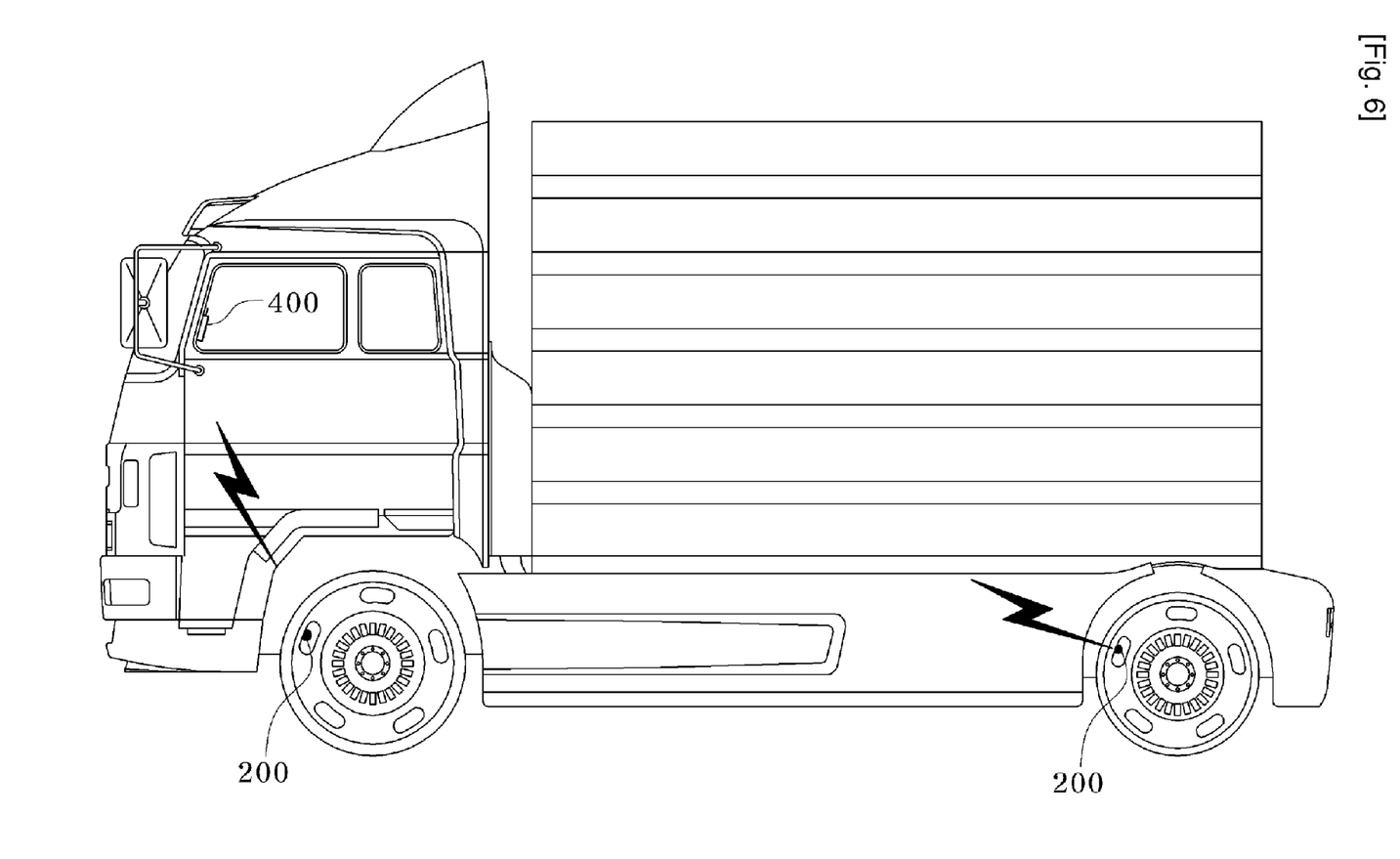
FIG. 6 is a view showing the pressure sensor of the present invention mounted on the tire and communicating with a display adjacent to a driver.

FIG. 6 is a view of the pressure sensor 200 of the present invention mounted on the tire and communicating with a display 400 adjacent to a driver. Since the pressure sensor 200 in accordance with an exemplary embodiment of the present invention is attached to the exterior of the tire, the pressure sensor 200 can directly perform wireless communication with the display 400 thus remarkably reducing an error ratio. In particular, since the air injection means and the connection pipe act as an antenna, there is no need to provide a separate antenna.

Figure 7:
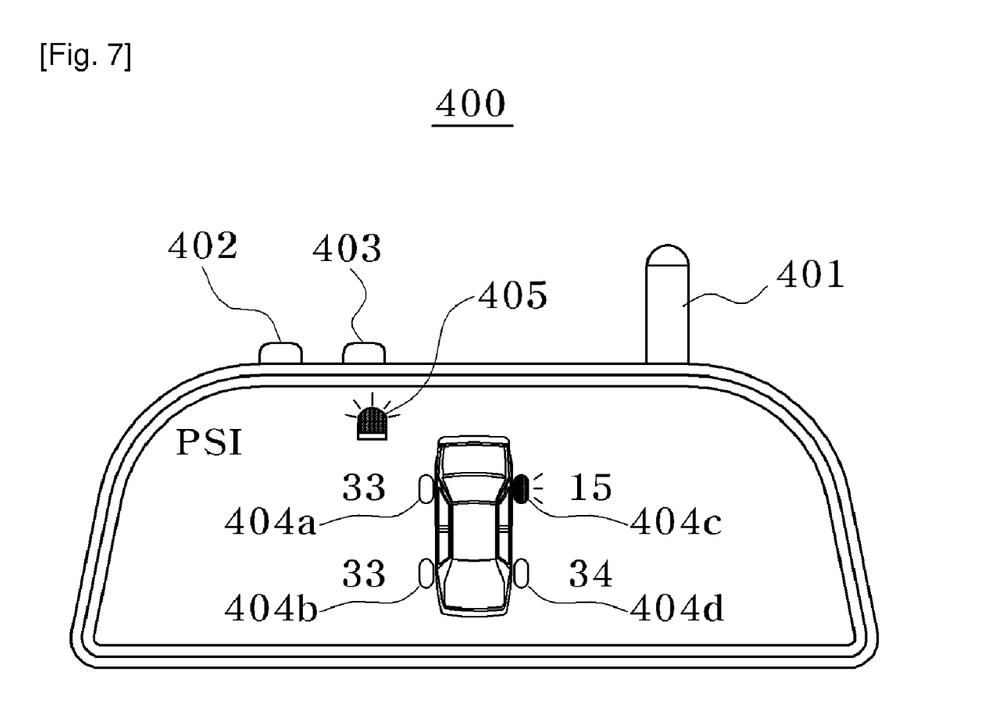
FIG. 7 is a view of the display used in the tire pressure monitoring system.

FIG. 7 is a view of the display 400 used in the tire pressure monitoring system.

The display 400 is attached to a dashboard of a vehicle, and includes an antenna 401 for wireless communication with the pressure sensor, a control button 402 for operating the display, and a setup button 403.

As shown in FIG. 7, the display 400 includes four tire pressure display lamps 404a, 404b, 404c and 404d, and an alarm lamp 405 to show pressure values of the tires in various manners. When an air pressure of a specific tire is lower than a preset value, the display lamp 404c of the corresponding tire and the alarm lamp 405 flash to alert the driver. Thereby, the driver can readjust the air pressure of the corresponding tire to prevent an accident.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. An apparatus comprising:
    a first tire-pressure measurement sensor that includes:
        a pressure detector configured to be mounted to a wheel of a tire outside the tire and to measure an air pressure in the tire;
        a wireless transmitter operatively coupled to the pressure detector and configured to wirelessly transmit a value representing the measured air pressure from the pressure detector to a remote display in a vehicle;
        a conduit having an air passageway, wherein the conduit is connected to the pressure detector and includes a connection pipe and a connection-pipe attachment mechanism configured to fasten the connection pipe to an outside end of an air-injection stem of the tire such that the air passageway is connected to the air-injection stem and extends between the air-injection stem of the tire and the pressure detector; and
        an air-injection port connected to the air passageway, wherein the air-injection port is configured to receive injected air and pass the injected air to the air-injection stem of the tire through the air passageway.

2. The apparatus of claim 1, wherein the conduit further comprises a flexible hose interposed between and connected to the connection pipe and the pressure detector.

3. The apparatus of claim 1, wherein the connection-pipe attachment mechanism includes internal threads, wherein the internal threads of the connection-pipe attachment mechanism are configured to mate with external threads of the air-injection stem of the tire.

4. The apparatus of claim 1, wherein the first tire-pressure measurement sensor includes a C-shaped bracket configured to securely fix the tire-pressure measurement sensor to a wheel of the tire.

5. The apparatus of claim 1, wherein the air-injection port and the conduit are configured to function as an antenna for the transmitter.

6. The apparatus of claim 1, wherein the connection pipe has an outer diameter substantially equal to an inner diameter of the air-injection stem such that the connection pipe is configured to be inserted into the air-injection stem.

7. The apparatus of claim 1, wherein the apparatus further includes:
    a vehicle having a plurality of tires;
    a plurality of tire-pressure-measurement sensors including the first tire-pressure-measurement sensor and at least one other tire-pressure-measurement sensor, wherein each of the plurality of tire-pressure-measurement sensors is operatively coupled to one of the plurality of tires, and wherein each one of the plurality of tire-pressure-measurement sensors includes a transmitter configured to wirelessly transmit air-pressure information obtained from its tire-pressure-measurement sensor;
    a wireless receiver connected to the vehicle and configured to receive the transmitted air-pressure information from each of the plurality of tire-pressure-measurement sensors; and
    a display operatively connected to the receiver, wherein the display is configured to show an air pressure of each of the plurality of tires based on the received air-pressure information.

8. The apparatus of claim 1, wherein the air-injection port has a shape that is substantially similar to a shape of the air-injection stem.

* * * * *